United States Patent
Lee et al.

(10) Patent No.: US 10,569,782 B2
(45) Date of Patent: Feb. 25, 2020

(54) INTERACTIVE AUTONOMOUS SAFE DRIVING SYSTEM AND DECIDING METHOD THEREOF

(71) Applicant: Automotive Research & Testing Center, Changhua County (TW)

(72) Inventors: Chao-Yang Lee, Changhua County (TW); Hung-Yih Tsai, Changhua County (TW)

(73) Assignee: Automotive Research & Testing Center, Changhua County (TW)

( * ) Notice: Subject to any disclaimer, the term of this patent is extended or adjusted under 35 U.S.C. 154(b) by 488 days.

(21) Appl. No.: 15/393,276

(22) Filed: Dec. 29, 2016

(65) Prior Publication Data
US 2018/0186376 A1    Jul. 5, 2018

(51) Int. Cl.
*B60W 30/00* (2006.01)
*B60W 30/182* (2020.01)
*B60W 30/095* (2012.01)
*B60W 50/14* (2020.01)
*G05D 1/00* (2006.01)
*B60W 50/10* (2012.01)
*B60W 30/09* (2012.01)

(52) U.S. Cl.
CPC .......... *B60W 30/182* (2013.01); *B60W 30/09* (2013.01); *B60W 30/0956* (2013.01); *B60W 50/10* (2013.01); *B60W 50/14* (2013.01); *G05D 1/0061* (2013.01); *G05D 1/0088* (2013.01); *B60W 2520/04* (2013.01); *G05D 2201/0213* (2013.01)

(58) Field of Classification Search
USPC .......................................................... 701/23
See application file for complete search history.

(56) References Cited

U.S. PATENT DOCUMENTS

| | | | | |
|---|---|---|---|---|
| 9,785,145 B2 * | 10/2017 | Gordon | ................ | G05D 1/0061 |
| 9,978,285 B2 * | 5/2018 | Khaghani | ............ | G01C 21/165 |
| 2015/0120124 A1 | 4/2015 | Bartels et al. | | |
| 2017/0227959 A1 * | 8/2017 | Lauffer | ................ | G05D 1/0088 |

* cited by examiner

*Primary Examiner* — James M McPherson
(74) *Attorney, Agent, or Firm* — CKC & Partners Co., LLC

(57) ABSTRACT

A deciding method of an interactive autonomous safe driving system for switching a driving mode of a vehicle includes an environmental detecting step and a driving mode judging step. The environmental detecting step is for driving an environmental detecting device to sense environmental conditions of the vehicle so as to generate a plurality of environmental condition data. The driving mode judging step is for controlling the driving mode by a controlling device according to the environmental condition data. The interactive autonomous safe driving system includes an environmental detecting device, a switching device and a controlling device. The environmental detecting device includes a plurality of environmental sensors. The environmental sensors sense environmental conditions of the vehicle so as to generate a plurality of environmental condition data. The controlling device controls the driving mode according to the switching state and the environmental condition data.

8 Claims, 7 Drawing Sheets

INTERACTIVE AUTONOMOUS SAFE DRIVING SYSTEM AND DECIDING METHOD THEREOF

BACKGROUND

Technical Field

The present disclosure relates to an interactive driving system and a deciding method thereof. More particularly, the present disclosure relates to an interactive autonomous safe driving system and a deciding method thereof having high safety, safe driving takeover, high stability and high convenience.

Description of Related Art

In recent years, an automatic driving system (ADS) will be one of the intelligent vehicle technologies developed by the manufacturer for realizing an unmanned automatic driving technology in the future. The automatic driving system is mainly used to control a vehicle by a controlling device and various sensors so as to enhance driving safety.

There are many automatic driving technologies in the market. One conventional automatic driving technology is to switch a driving mode between a manual driving mode and an autonomous driving mode by a manual switching device. If the driver wants to drive the vehicle in the autonomous driving mode, the driver can operate the manual switching device to change the driving mode to the autonomous driving mode. If the driver wants to drive the vehicle in the manual driving mode, the driver can operate the manual switching device to change the driving mode to the manual driving mode. Before the end of the autonomous driving mode, the dashboard of the vehicle appears the countdown timer, and the system waits for the driver to retake control of the vehicle. If the driver does not change the driving mode to the manual driving mode during the countdown, the driving mode still maintains the autonomous driving mode. However, this kind of automatic driving technology only utilizes the manual switching device to judge the takeover request of the driver, and the problems of mis-touch and insufficient safety is likely to occur. Therefore, it is commercially desirable to develop an interactive autonomous safe driving system and a deciding method of the interactive autonomous safe driving system with high safety, safe driving takeover, high stability and high convenience.

SUMMARY

According to one aspect of the present disclosure, an interactive autonomous safe driving system for switching a driving mode of a vehicle includes an environmental detecting device, a switching device and a controlling device. The environmental detecting device is disposed on the vehicle. The environmental detecting device includes a plurality of environmental sensors. The environmental sensors sense environmental conditions of the vehicle so as to generate a plurality of environmental condition data. The switching device is disposed on the vehicle and has a switching state which switches the driving mode of the vehicle. The controlling device is disposed on the vehicle and signally connected to the environmental detecting device and the switching device. The controlling device controls the driving mode according to the switching state and the environmental condition data.

According to another aspect of the present disclosure, a deciding method of an interactive autonomous safe driving system for switching a driving mode of a vehicle includes an environmental detecting step and a driving mode judging step. The environmental detecting step is for driving an environmental detecting device to sense environmental conditions of the vehicle so as to generate a plurality of environmental condition data. The driving mode judging step is for controlling the driving mode by a controlling device according to the environmental condition data.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
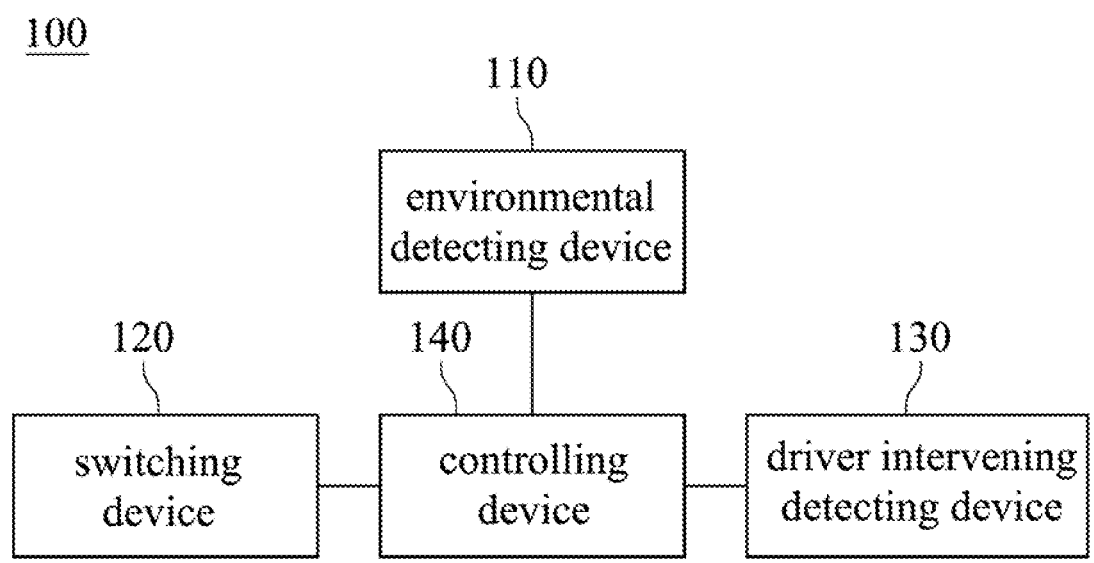
FIG. 1 is a block diagram showing an interactive autonomous safe driving system according to one embodiment of the present disclosure.

FIG. 1 is a block diagram showing an interactive autonomous safe driving system 100 according to one embodiment of the present disclosure. In FIG. 1, the interactive autonomous safe driving system 100 is used for switching a driving mode of a vehicle. The driving mode of the vehicle can be separated into a manual driving mode (MDM) and an autonomous driving mode (ADM). The interactive autonomous safe driving system 100 includes an environmental detecting device 110, a switching device 120, a driver intervening detecting device 130 and a controlling device 140.

The environmental detecting device 110 is disposed on the vehicle. The environmental detecting device 110 includes a plurality of environmental sensors. The environmental sensors are mounted on different positions of the vehicle and sense environmental conditions of the vehicle so as to generate a plurality of environmental condition data. The environmental conditions include an internal condition and an external environmental condition of the vehicle, such as a condition of a road environment, a physical condition of a driver, a condition of the vehicle itself, a condition of one or more surrounding vehicles or a condition of other surrounding objects.

The switching device 120 is disposed on the vehicle and has a switching state which switches the driving mode of the vehicle. For example, the switch device 120 is mounted on one side or a front side of a steering wheel of the vehicle. The switching device 120 may be pressed by the driver's hand or be operated by the driver according to a voice recognition technique, and then alternately changes the switching state between the manual driving mode MDM and the autonomous driving mode ADM, so that the switching state of the switching device 120 can be used to directly control the driving mode of the vehicle.

The driver intervening detecting device 130 includes a plurality of driver intervening sensors. The driver intervening sensors sense a degree of an intervention of a driver to generate a driver intervening data. For example, the driver intervening sensors include a throttle sensor, a steering wheel sensor, a brake sensor, a transmission shift position sensor and a directional light sensor. The throttle sensor is used for sensing a depth and a speed of an accelerator pedal pushed by the driver. The steering wheel sensor is used for sensing a rotational angle and a rotational speed of a steering wheel rotated by the driver. The brake sensor is used for sensing a depth and a speed of a brake pedal stepped on by the driver. The transmission shift position sensor is used for sensing a position of a transmission shift lever of the vehicle changed by the driver. The directional light sensor is used for sensing a condition of a directional light controlled by the driver. Therefore, the driver intervening sensors of the driver intervening detecting device 130 of the present disclosure can generate feedback values to assist in determining that the driving mode of the vehicle is in the manual driving mode MDM or in the autonomous driving mode ADM.

The controlling device 140 is disposed on the vehicle and signally connected to the environmental detecting device 110, the switching device 120 and the driver intervening detecting device 130. The controlling device 140 controls and determines the driving mode according to the switching state, the environmental condition data and the driver intervening data. The controlling device 140 may be an electronic control unit (ECU), a microprocessor, or other electronic controllers for use in the vehicle. In addition, when the driving mode is originally in an autonomous driving mode ADM, the controlling device 140 controls the vehicle according to the environmental condition data and stores a security condition threshold, a driver intervening threshold and a system controlling threshold. The controlling device 140 judges whether or not the environmental condition data and the driver intervening data conform to the security condition threshold and the driver intervening threshold, respectively. Moreover, the controlling device 140 judges whether or not the environmental condition data conforms to the system controlling threshold. Therefore, the interactive autonomous safe driving system 100 can determine an exchange between the manual driving mode MDM and the autonomous driving mode ADM according to the internal and external environmental condition of the vehicle and a physical condition of a driver, and may be combined with a driver safety takeover mechanism so as to improve the safety, stability and convenience of the switching process in the autonomous driving mode ADM.

Figure 2:
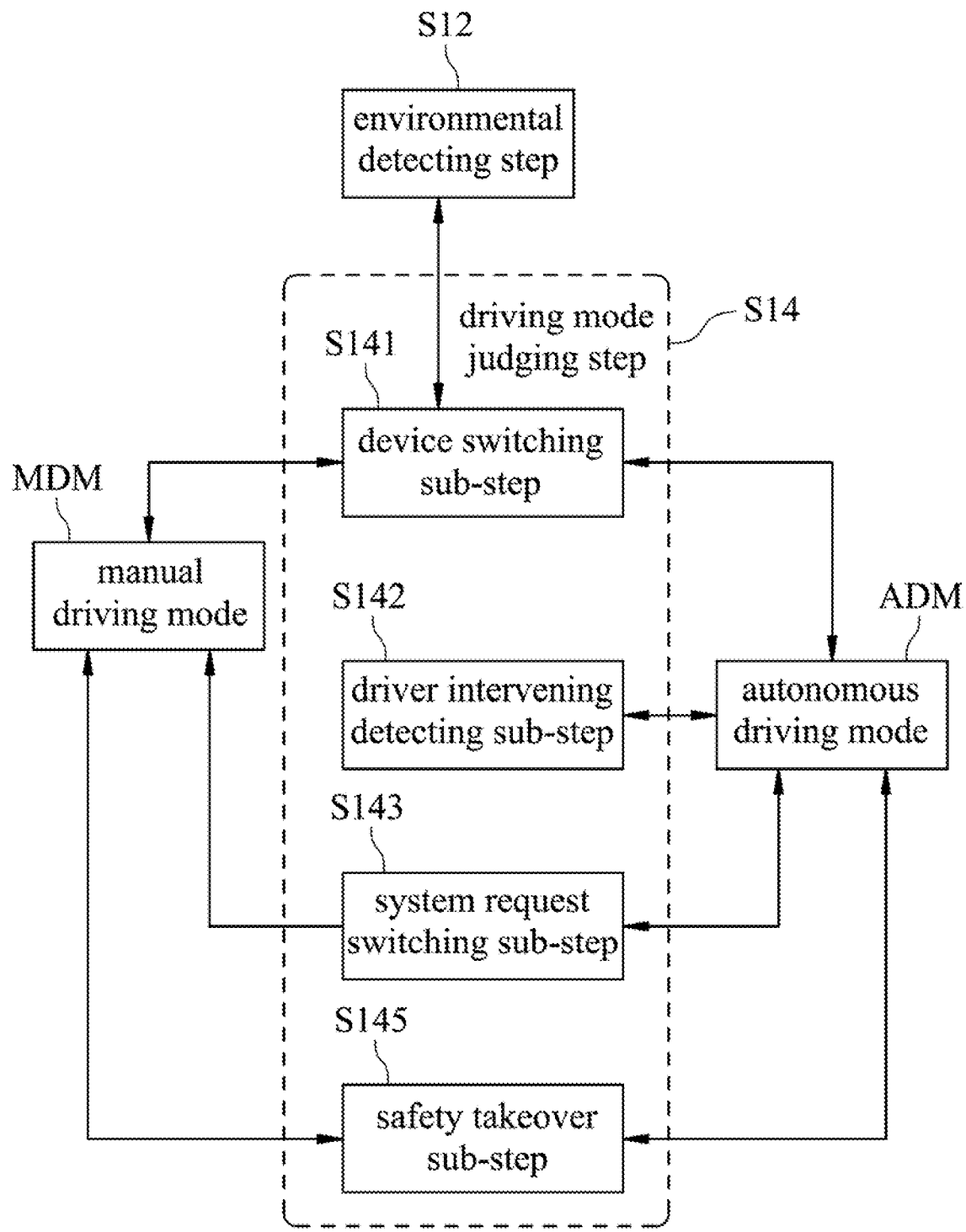
FIG. 2 is a flow chart showing a deciding method of the interactive autonomous safe driving system of FIG. 1 according to the first embodiment of the present disclosure.

FIG. 2 is a flow chart showing a deciding method 200 of the interactive autonomous safe driving system 100 of FIG. 1 according to the first embodiment of the present disclosure. In FIGS. 1 and 2, the deciding method 200 of an interactive autonomous safe driving system 100 for switching a driving mode of a vehicle includes an environmental detecting step S12 and a driving mode judging step S14.

The environmental detecting step S12 is for driving an environmental detecting device 110 to sense environmental conditions of the vehicle so as to generate a plurality of environmental condition data to the controlling device 140.

The driving mode judging step S14 is for controlling the driving mode by the controlling device 140 according to the environmental condition data. The driving mode judging step S14 includes a device switching sub-step S141, a driver intervening detecting sub-step S142, a system request switching sub-step S143 and a safety takeover sub-step S145.

The device switching sub-step S141 is for operating a switching device 120 to generate a switching state. When the switching state is corresponding to a turn-on signal, the environmental detecting step S12 is then performed.

The driver intervening detecting sub-step S142 is for sensing a degree of an intervention of a driver to generate a driver intervening data by a driver intervening detecting device 130. The controlling device 140 stores a driver intervening threshold and judges whether or not the driver intervening data conforms to the driver intervening threshold.

The system request switching sub-step S143 is for judging whether or not the environmental condition data conforms to a system controlling threshold by the controlling device 140. It is assumed that the driving mode is originally in an autonomous driving mode ADM, and the controlling device 140 controls the vehicle according to the environmental condition data. When the environmental condition data conforms to the system controlling threshold, the driving mode maintains the autonomous driving mode ADM. When the environmental condition data doesn't conform to the system controlling threshold, the driving mode is switched from the autonomous driving mode ADM to a manual driving mode MDM.

The safety takeover sub-step S145 is for performing a system safety takeover mechanism or a driver safety takeover mechanism. The system safety takeover mechanism represents that the vehicle is taken over by the interactive autonomous safe driving system 100, and the driving mode is changed to the autonomous driving mode ADM. The driver safety takeover mechanism represents that the vehicle is taken over by the driver, and the driving mode is changed to the manual driving mode MDM. Accordingly, the deciding method 200 of the interactive autonomous safe driving system 100 of the present disclosure may conduct various functions of interaction to accomplish the exchange between a manual driving mode and an autonomous driving mode, so that the safety, stability and convenience of the switching process can be greatly improved. FIGS. 3-6 show four different deciding methods of the interactive autonomous safe driving system 100, respectively. The four different switching modes are "turning on the autonomous driving mode ADM by the driver", "turning off the autonomous driving mode ADM by the driver", "requesting to turn off the autonomous driving mode ADM by the system" and "temporarily intervening the autonomous driving mode ADM by the driver", respectively. All deciding methods of the interactive autonomous safe driving system 100 of FIGS. 3-6 can effectively accomplish the exchange between the manual driving mode MDM and the autonomous driving mode ADM, thus enhancing the safety, stability and convenience of the switching process.

Figure 3:
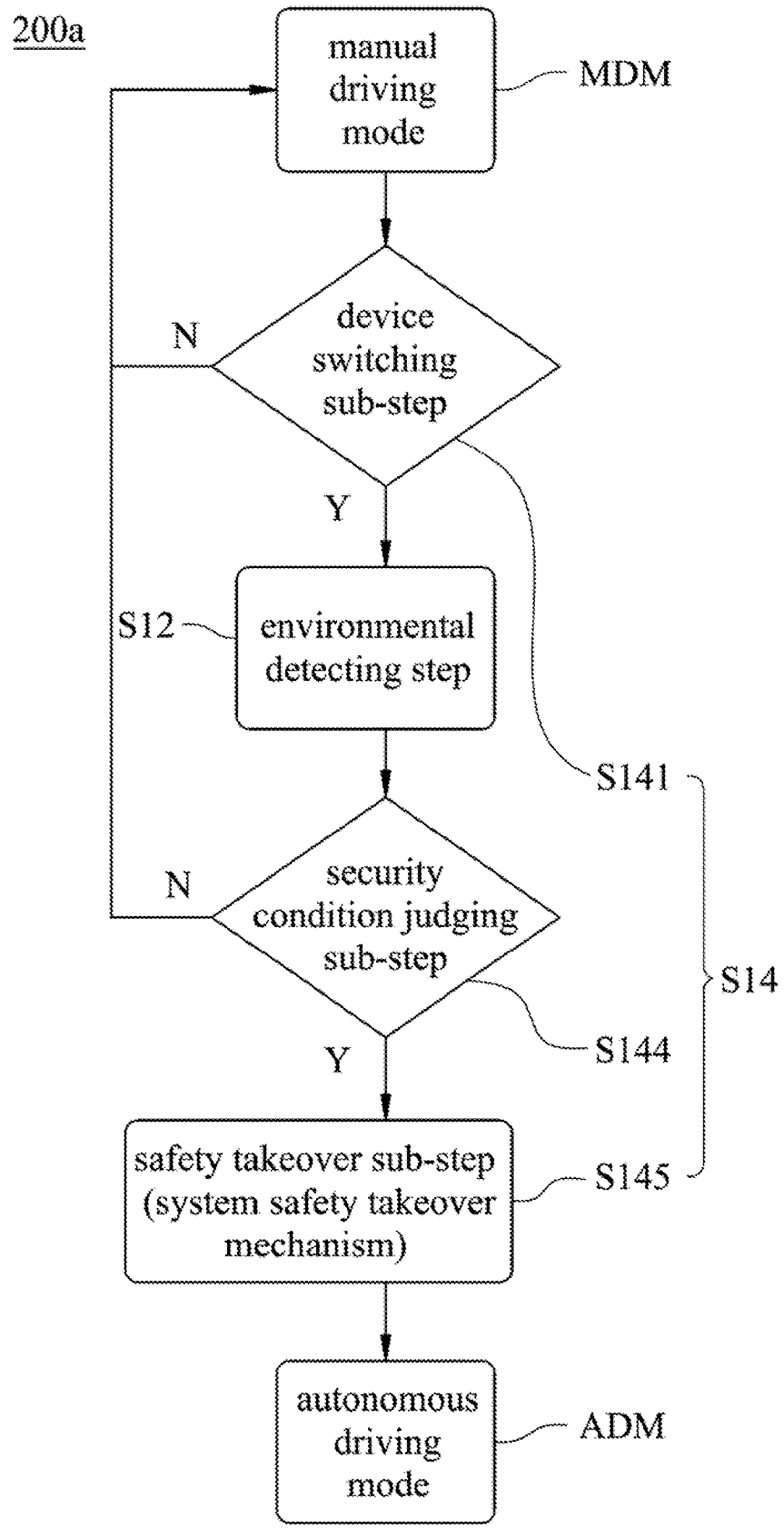
FIG. 3 is a flow chart showing a deciding method of the interactive autonomous safe driving system of FIG. 1 according to the second embodiment of the present disclosure.

FIG. 3 is a flow chart showing a deciding method 200a of the interactive autonomous safe driving system 100 of FIG. 1 according to the second embodiment of the present disclosure. In FIGS. 1-3, the deciding method 200a of the interactive autonomous safe driving system 100 is corresponding to the switching mode which is "turning on the autonomous driving mode ADM by the driver". The deciding method 200a includes an environmental detecting step S12 and a driving mode judging step S14. The environmental detecting step S12 is for driving an environmental detecting device 110 to sense environmental conditions of the vehicle so as to generate a plurality of environmental condition data to the controlling device 140. The driving mode judging step S14 includes a device switching sub-step S141, a security condition judging sub-step S144 and a safety takeover sub-step S145. The steps of the deciding method 200a of the interactive autonomous safe driving system 100 are carried out in order of the manual driving mode MDM, the device switching sub-step S141, the environmental detecting step S12, the security condition judging sub-step S144, the safety takeover sub-step S145 and the autonomous driving mode ADM. In detail, the driving mode of the vehicle is originally in the manual driving mode MDM. When the driver wants to switch the driving mode, the driver has to execute the device switching sub-step S141. The device switching sub-step S141 is for operating a switching device 120 to generate a switching state. When the switching state is corresponding to a turn-on signal, the environmental detecting step S12 is then performed and outputs the environmental condition data. The environmental condition data is utilized as a basis for the security condition judging sub-step S144. In other words, the security condition judging sub-step S144 is for judging whether or not the environmental condition data conforms to a security condition threshold by the controlling device 140. The above-mentioned judgments can be divided into three categories. First, when the switching state is corresponding to a turn-off signal in the device switching sub-step S141, the driving mode maintains the manual driving mode. Second, when the switching state is corresponding to the turn-on signal in the device switching sub-step S141, and the environmental condition data doesn't conform to the security condition threshold in the security condition judging sub-step S144, the driving mode maintains the manual driving mode. Third, when the switching state is corresponding to the turn-on signal in the device switching sub-step S141, and the environmental condition data conforms to the security condition threshold in the security condition judging sub-step S144, the controlling device 140 controls the vehicle according to the environmental condition data, and then the safety takeover sub-step S145 is performed to accomplish a system safety takeover mechanism. The vehicle is automatically taken over by the interactive autonomous safe driving system 100, and the driving mode is switched from the manual driving mode MDM to the autonomous driving mode ADM. Accordingly, the deciding method 200a of the interactive autonomous safe driving system 100 can conduct the specific interaction to accomplish the exchange from the manual driving mode MDM to the autonomous driving mode ADM, thereby enhancing the safety, stability and convenience of the switching process. Furthermore, the environmental detecting step S12 can determine the exchange between the manual driving mode MDM and the autonomous driving mode ADM according to the internal and external environmental condition of the vehicle and the physical condition of the driver so as to improve the safety of the driver's manipulation.

Figure 4:
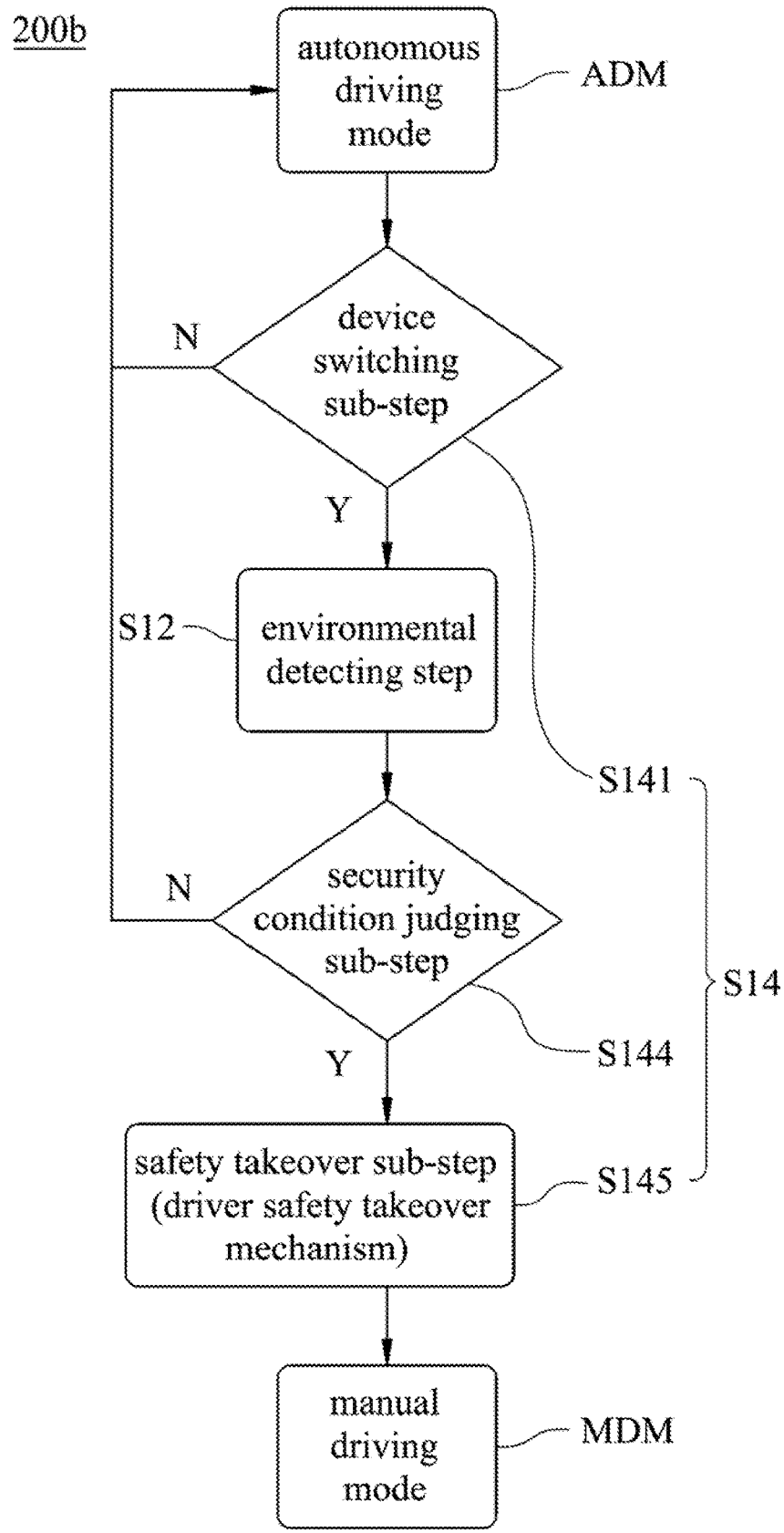
FIG. 4 is a flow chart showing a deciding method of the interactive autonomous safe driving system of FIG. 1 according to the third embodiment of the present disclosure.

FIG. 4 is a flow chart showing a deciding method of the interactive autonomous safe driving system of FIG. 1 according to the third embodiment of the present disclosure. In FIGS. 1, 2 and 4, the deciding method 200b of the interactive autonomous safe driving system 100 is corresponding to the switching mode which is "turning off the autonomous driving mode ADM by the driver". The deciding method 200b includes an environmental detecting step S12 and a driving mode judging step S14. The environmental detecting step S12 is for driving an environmental detecting device 110 to sense environmental conditions of the vehicle so as to generate a plurality of environmental condition data to the controlling device 140. The driving mode judging step S14 includes a device switching sub-step S141, a security condition judging sub-step S144 and a safety takeover sub-step S145. The steps of the deciding method 200b of the interactive autonomous safe driving system 100 are carried out in order of the autonomous driving mode ADM, the device switching sub-step S141, the environmental detecting step S12, the security condition judging sub-step S144, the safety takeover sub-step S145 and the manual driving mode MDM. In detail, the driving mode of the vehicle is originally in the autonomous driving mode ADM. The controlling device 140 controls the vehicle according to the environmental condition data. When the driver wants to switch the driving mode, the driver has to execute the device switching sub-step S141. The device switching sub-step S141 is for operating a switching device 120 to generate a switching state. When the switching state is corresponding to a turn-off signal, the environmental detecting step S12 is then performed and outputs the environmental condition data. After that, the interactive autonomous safe driving system 100 performs the security condition judging sub-step S144 for judging whether or not the environmental condition data conforms to a security condition threshold by the controlling device 140. The above-mentioned judgments can be divided into three categories. First, when the switching state is corresponding to a turn-on signal in the device switching sub-step S141, the driving mode maintains the autonomous driving mode ADM. Second, when the switching state is corresponding to the turn-off signal in the device switching sub-step S141, and the environmental condition data doesn't conform to the security condition threshold in the security condition judging sub-step S144, the driving mode maintains the autonomous driving mode ADM. Third, when the switching state is corresponding to the turn-off signal in the device switching sub-step S141, and the environmental condition data conforms to the security condition threshold in the security condition judging sub-step S144, and then the safety takeover sub-step S145 is performed to accomplish the driver safety takeover mechanism. The vehicle is taken over by the driver, and the driving mode is switched from the autonomous driving mode ADM to the manual driving mode MDM. Consequently, the deciding method 200b can conduct the specific interaction to accomplish the exchange from the autonomous driving mode ADM to the manual driving mode MDM, thus enhancing the safety, stability and convenience of the switching process. Moreover, the interactive autonomous safe driving system 100 can determine the exchange between the manual driving mode MDM and the autonomous driving mode ADM according to the internal and external environmental condition of the vehicle and the physical condition of the driver so as to improve the safety of the driver's manipulation.

Figure 5:
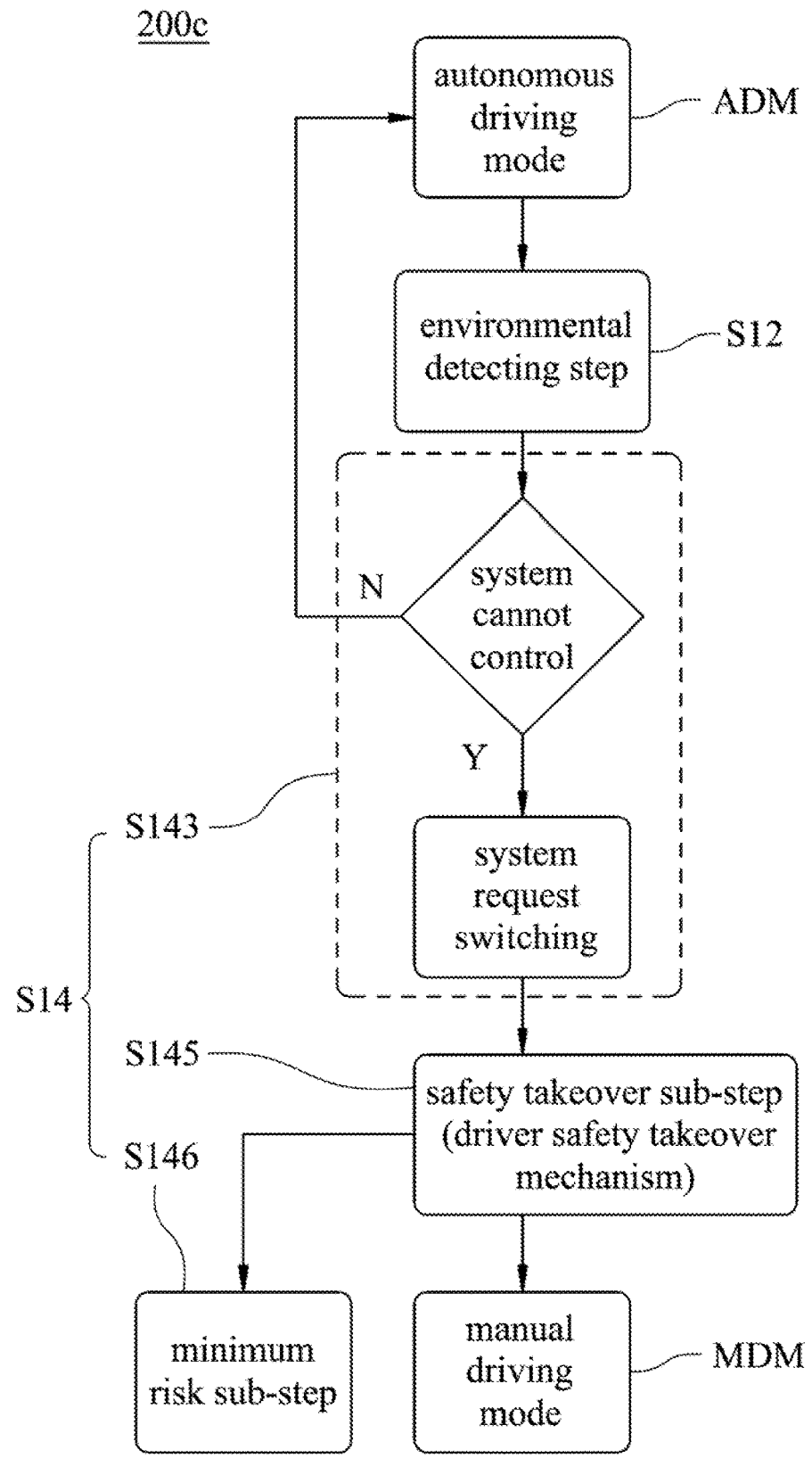
FIG. 5 is a flow chart showing a deciding method of the interactive autonomous safe driving system of FIG. 1 according to the fourth embodiment of the present disclosure.

FIG. 5 is a flow chart showing a deciding method 200c of the interactive autonomous safe driving system 100 of FIG. 1 according to the fourth embodiment of the present disclosure. In FIGS. 1, 2 and 5, the deciding method 200c of the interactive autonomous safe driving system 100 is corresponding to the switching mode which is "requesting to turn off the autonomous driving mode ADM by the system". The deciding method 200c includes an environmental detecting step S12 and a driving mode judging step S14. The environmental detecting step S12 is for driving an environmental detecting device 110 to sense environmental conditions of the vehicle so as to generate a plurality of environmental condition data to the controlling device 140. The driving mode judging step S14 includes a system request switching sub-step S143, a safety takeover sub-step S145 and a minimum risk sub-step S146. The steps of the deciding method 200c of the interactive autonomous safe driving system 100 are carried out in order of the autonomous driving mode ADM, the environmental detecting step S12, the system request switching sub-step S143, the safety takeover sub-step S145 and the manual driving mode MDM. The minimum risk sub-step S146 is performed after the safety takeover sub-step S145 and is executed in synchronization with the manual driving mode MDM. In detail, the driving mode of the vehicle is originally in the autonomous driving mode ADM. The controlling device 140 controls the vehicle according to the environmental condition data, and the interactive autonomous safe driving system 100 performs the system request switching sub-step S143 at any time. The system request switching sub-step S143 is for judging whether or not the environmental condition data conforms to a system controlling threshold by the controlling device 140. When the environmental condition data conforms to the system controlling threshold, the driving mode maintains the autonomous driving mode ADM. On the contrary, when the environmental condition data doesn't conform to the system controlling threshold, the system request switching sub-step S143 requests the controlling device 140 to switch the driving mode from the autonomous driving mode ADM to the manual driving mode MDM. In addition, the safety takeover sub-step S145 is performed to accomplish the driver safety takeover mechanism. The vehicle is taken over by the driver, and the driving mode is switched from the autonomous driving mode ADM to the manual driving mode MDM. The minimum risk sub-step S146 is for driving the vehicle by the controlling device 140 to a safe location satisfied with a security condition threshold, such as parking the vehicle at a roadside. Hence, deciding method 200c of the interactive autonomous safe driving system 100 can instantaneously judge a control capability of the system and a vehicle's situation so as to greatly increase the stability of the automatic control and the safety of the driver.

Figure 6:
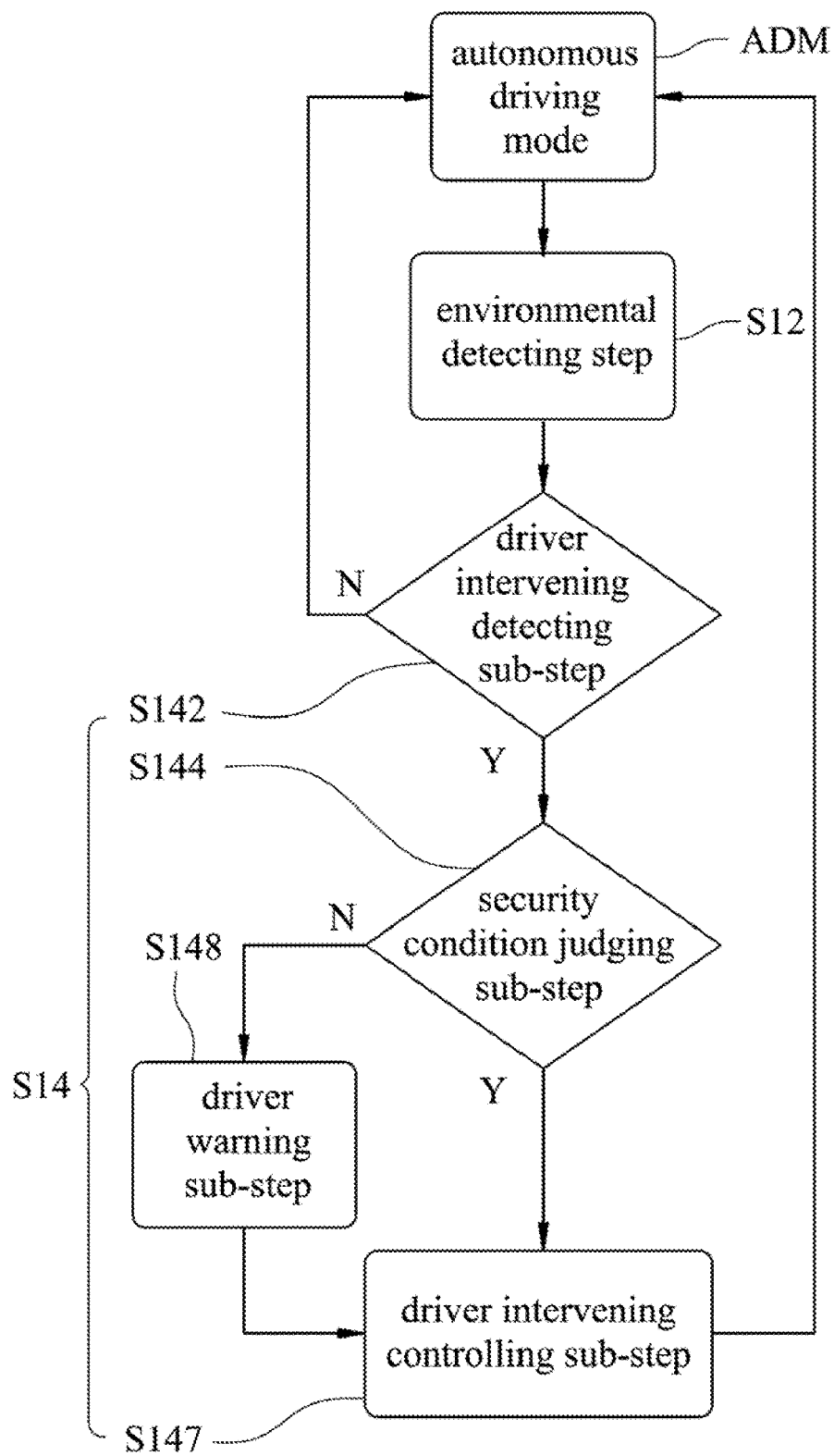
FIG. 6 is a flow chart showing a deciding method of the interactive autonomous safe driving system of FIG. 1 according to the fifth embodiment of the present disclosure.

FIG. 6 is a flow chart showing a deciding method 200d of the interactive autonomous safe driving system 100 of FIG. 1 according to the fifth embodiment of the present disclosure. In FIGS. 1, 2 and 6, the deciding method 200d of the interactive autonomous safe driving system 100 is corresponding to the switching mode which is "temporarily intervening the autonomous driving mode ADM by the driver". The deciding method 200d includes an environmental detecting step S12 and a driving mode judging step S14. The environmental detecting step S12 is for driving an environmental detecting device 110 to sense environmental conditions of the vehicle so as to generate a plurality of environmental condition data to the controlling device 140. The driving mode judging step S14 includes a driver intervening detecting sub-step S142, a security condition judging sub-step S144, a driver intervening controlling sub-step S147 and a driver warning sub-step S148. The steps of the deciding method 200d of the interactive autonomous safe driving system 100 are carried out in order of the autonomous driving mode ADM, the environmental detecting step S12, the driver intervening detecting sub-step S142, the security condition judging sub-step S144, the driver warning sub-step S148 and the driver intervening controlling sub-step S147. In detail, the driving mode of the vehicle is originally in the autonomous driving mode ADM. The controlling device 140 controls the vehicle according to the environmental condition data, and the interactive autonomous safe driving system 100 performs the driver intervening detecting sub-step S142 at any time. The driver intervening detecting sub-step S142 is for sensing a degree of an intervention of a driver to generate a driver intervening data by a driver intervening detecting device 130. The controlling device 140 stores a security condition threshold and a driver intervening threshold. The controlling device 140 judges whether or not the environmental condition data and the driver intervening data conform to the security condition threshold and the driver intervening threshold, respectively. If the driver intervention doesn't exceed a predetermined degree, the driving mode of the interactive autonomous safe driving system 100 maintains the autonomous driving mode ADM. Conversely, if the driver intervention exceeds the predetermined degree, the interactive autonomous safe driving system 100 performs the security condition judging sub-step S144 for judging whether or not the environmental condition data conforms to the security condition threshold by the controlling device 140. When the environmental condition data conforms to the security condition threshold, the driver intervening controlling sub-step S147 is performed by the interactive autonomous safe driving system 100. The driver intervening controlling sub-step S147 is for temporarily controlling the vehicle by the driver until the driver intervention is lower than the predetermined degree. The driver's operation is only allowed for a predetermined time. After the driver intervention being lower than the predetermined degree in the predetermined time, the interactive autonomous safe driving system 100 is changed back to the original default settings in autonomous driving mode ADM. Furthermore, when the environmental condition data doesn't conform to the security condition threshold, the interactive autonomous safe driving system 100 performs the driver warning sub-step S148, and then the driver intervening controlling sub-step S147 is performed. The driver warning sub-step S148 is for warning the driver of a potentially unsafe condition by an alert signal which may be a visual alert, a vibration alert, an audible alert, a voice command or a heads-up-display alert. Accordingly, the deciding method 200d of the interactive autonomous safe driving system 100 of the present disclosure can achieve the manual control within a short time and return to the original automatic driving mode ADM after the driver intervening operation, thereby increasing the convenience of the driver and preventing mis-touch caused by the driver. For example, if the driver meets a condition that a front vehicle slows down and changes lanes, the driver can first depress the brake pedal slightly, and then relax the brake pedal until the front vehicle is completely out of the current lane, thus automatically returning the interactive autonomous safe driving system 100 to the original automatic driving mode ADM. In this situation, the driver only needs to depress or relax the brake pedal of the vehicle without operating the switching device to change the driving mode between the automatic driving mode ADM and the manual driving mode MDM, so that the deciding method 200d can not only reduce the number of switching, but also increase the convenience of the interactive switching mechanism and solve the problem of mis-touch and insufficient security of a conventional switching device.

Figure 7:
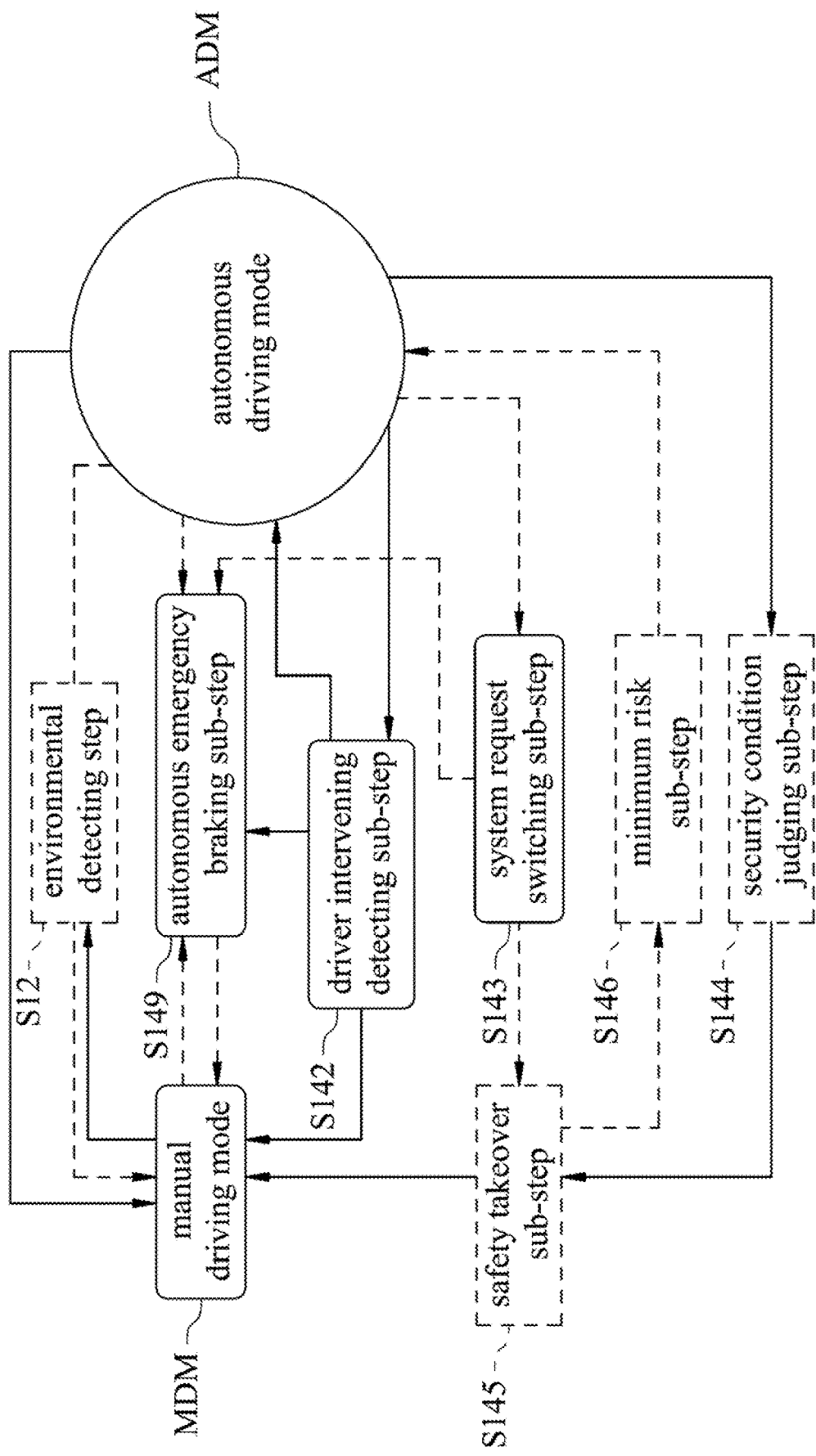
FIG. 7 is a flow chart showing a deciding method of the interactive autonomous safe driving system of FIG. 1 according to the sixth embodiment of the present disclosure.

FIG. 7 is a flow chart showing a deciding method 200e of the interactive autonomous safe driving system 100 of FIG. 1 according to the sixth embodiment of the present disclosure. In FIGS. 1, 2 and 7, the deciding method 200d of the interactive autonomous safe driving system 100 includes an environmental detecting step S12, a driver intervening detecting sub-step S142, a system request switching sub-step S143, a security condition judging sub-step S144, a safety takeover sub-step S145, a minimum risk sub-step S146 and an autonomous emergency braking sub-step S149. In FIG. 7, the detail of the environmental detecting step S12, the driver intervening detecting sub-step S142, the system request switching sub-step S143 and the safety takeover sub-step S145 are the same as the embodiments of FIG. 2, and will not be described again herein. In FIG. 7, the detail of the security condition judging sub-step S144 and the minimum risk sub-step S146 are the same as the security condition judging sub-step S144 of FIG. 3 and the minimum risk sub-step S146 of FIG. 5, respectively, and will not be described again herein. In FIG. 7, the deciding method 200e of the interactive autonomous safe driving system 100 further includes the autonomous emergency braking sub-step S149 for judging whether or not an emergency braking condition is detected by a brake sensor of a driver intervening detecting device 130. The emergency braking condition represents that the driver steps on the brake pedal very rapidly, and must not meet the system controlling threshold and security condition threshold. Therefore, when the emergency braking condition is detected by the brake sensor, the driving mode is forced to switch from the autonomous driving mode ADM to a manual driving mode MDM by the interactive autonomous safe driving system 100.

It is also worth mentioning that the autonomous driving mode ADM includes a lane following system (LFS), a lane keeping system (LKS), an adaptive cruise control (ACC) and a lane change support (LCS). These autonomous driving techniques are combined with the controlling device 140 and corresponding sensors so as to safely accomplish the interactive switching mechanism and provide a user-friendly manipulation, a safe takeover and a safe switching operation.

According to the aforementioned embodiments and examples, the advantages of the present disclosure are described as follows.

1. The interactive autonomous safe driving system and the deciding method thereof of the present disclosure can conduct various functions of interaction to accomplish the exchange between the manual driving mode and the autonomous driving mode, so that the safety, stability and convenience of the switching process can be greatly improved.

2. The interactive autonomous safe driving system and the deciding method thereof of the present disclosure can determine the exchange between the manual driving mode and the autonomous driving mode according to the internal and external environmental condition of the vehicle and the physical condition of the driver, and may be combined with a minimum risk mechanism so as to further improve the safety of the driver's manipulation.

3. The interactive autonomous safe driving system and the deciding method thereof of the present disclosure can utilize the driver intervening detecting sub-step and the security condition judging sub-step to reduce the number of switching, increase the convenience of the interactive switching mechanism and solve the problem of mis-touch and insufficient security of the conventional switching device.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An interactive autonomous safe driving system for switching a driving mode of a vehicle, the interactive autonomous safe driving system comprising:
   an environmental detecting device disposed on the vehicle, wherein the environmental detecting device comprises a plurality of environmental sensors, the plurality of environmental sensors sense environmental conditions of the vehicle so as to generate a plurality of environmental condition data;
   a switching device disposed on the vehicle and having a switching state which switches the driving mode of the vehicle; and
   a controlling device disposed on the vehicle and signally connected to the environmental detecting device and the switching device, wherein the controlling device controls the driving mode according to the switching state and the plurality of environmental condition data, and the controlling device configured to implement steps of a deciding method comprises:
   driving the environmental detecting device to sense environmental conditions of the vehicle so as to generate the plurality of environmental condition data; and
   controlling the driving mode by the controlling device according to the plurality of environmental condition data;
   wherein the driving mode is originally in an autonomous driving mode, and the controlling device controls the vehicle according to the plurality of environmental condition data;
   wherein the deciding method further comprises:
      judging whether or not the plurality of environmental condition data conform to a system controlling threshold by the controlling device;
   wherein when the plurality of environmental condition data conforms to the system controlling threshold, the driving mode maintains the autonomous driving mode;
   wherein when the plurality of environmental condition data do not conform to the system controlling threshold, the driving mode is switched from the autonomous driving mode to a manual driving mode;
   wherein the deciding method further comprises:
      driving the vehicle by the controlling device to a roadside location.

2. The interactive autonomous safe driving system of claim 1, further comprising:
   a driver intervening detecting device signally connected to the controlling device, wherein the driver intervening detecting device comprises a plurality of driver intervening sensors, the plurality of driver intervening sensors sense a degree of an intervention of a driver to generate a driver intervening data;
   wherein the controlling device controls the vehicle according to the plurality of environmental condition data and stores the roadside location and a driver intervening threshold, the controlling device judges whether or not the plurality of environmental condition data and the driver intervening data conform to the roadside location and the driver intervening threshold, respectively.

3. A deciding method of the interactive autonomous safe driving system of claim 1 for switching the driving mode of the vehicle, the deciding method comprising:
   driving the environmental detecting device to sense environmental conditions of the vehicle so as to generate the plurality of environmental condition data; and
   controlling the driving mode by the controlling device according to the plurality of environmental condition data;
   wherein the driving mode is originally in an autonomous driving mode, and the controlling device controls the vehicle according to the plurality of environmental condition data;
   wherein the deciding method further comprises:
      judging whether or not the plurality of environmental condition data conform to a system controlling threshold by the controlling device;
   wherein when the plurality of environmental condition data conform to the system controlling threshold, the driving mode maintains the autonomous driving mode;
   wherein when the plurality of environmental condition data do not conform to the system controlling threshold, the driving mode is switched from the autonomous driving mode to a manual driving mode;
   wherein the deciding method further comprises:
      driving the vehicle by the controlling device to the roadside location.

4. The deciding method of the interactive autonomous safe driving system of claim 3, wherein,
   the deciding method further comprises:
      operating a switching device to generate a switching state, wherein when the switching state is corresponding to a turn-off signal, the environmental detecting step is then performed; and
      judging whether or not the plurality of environmental condition data conform to the roadside location by the controlling device.

5. The deciding method of the interactive autonomous safe driving system of claim 4, wherein,
   when the switching state is corresponding to a turn-on signal, the driving mode maintains the autonomous driving mode;
   when the switching state is corresponding to the turn-off signal, and the plurality of environmental condition data do not conform to the roadside location, the driving mode maintains the autonomous driving mode; and
   when the switching state is corresponding to the turn-off signal, and the plurality of environmental condition data conform to the roadside location, the driving mode is switched from the autonomous driving mode to a manual driving mode.

6. The deciding method of the interactive autonomous safe driving system of claim 3, wherein,
   the deciding method further comprises:
      sensing a degree of an intervention of the driver to generate a driver intervening data by a driver intervening detecting device; and
      judging whether or not the plurality of environmental condition data conform to a roadside location by the controlling device.

7. The deciding method of the interactive autonomous safe driving system of claim 6, wherein,
   the controlling device stores a roadside location and a driver intervening threshold, the controlling device judges whether or not the driver intervening data conforms to the driver intervening threshold.

8. The deciding method of the interactive autonomous safe driving system of claim 3, wherein,
   the deciding method further comprises:
      judging whether or not a brake sensor of a driver intervening detecting device detects a braking condition;
      wherein when the braking condition is detected by the brake sensor, the driving mode is switched from the autonomous driving mode to a manual driving mode.

* * * * *